(Model.)

2 Sheets—Sheet 1.

W. C. JOHNSON.
SASH FASTENER.

No. 373,985. Patented Nov. 29, 1887.

WITNESSES:
J. L. Bartine
Wm E. Blunt

INVENTOR
William C. Johnson
BY Campbell & ATT'YS.

N. PETERS, Photo-Lithographer, Washington, D. C.

(Model.)

2 Sheets—Sheet 2.

W. C. JOHNSON.
SASH FASTENER.

No. 373,985. Patented Nov. 29, 1887.

WITNESSES:
J. L. Bartine
Wm E. Blewett

INVENTOR
William C. Johnson
BY Campbell & Co. ATT'YS.

United States Patent Office.

WILLIAM C. JOHNSON, OF NEWARK, NEW JERSEY, ASSIGNOR TO ALFRED H. CROCKFORD, OF SAME PLACE.

SASH-FASTENER.

SPECIFICATION forming part of Letters Patent No. 373,985, dated November 29, 1887.

Application filed October 26, 1886. Serial No. 217,213. (Model.)

*To all whom it may concern:*

Be it known that I, WILLIAM C. JOHNSON, a citizen of the United States, residing at Newark, in the county of Essex and State of New Jersey, have invented certain new and useful Improvements in Sash and Door Fastenings; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention is designed to provide a sash and door fastening which cannot be operated from the outside, so as to unlock the window or door by any of the means ordinarily used, and which is also simple in construction, readily manipulated to lock and unlock the sash or door, and when locked prevents the rattling of the said sash or door.

Figure 1:
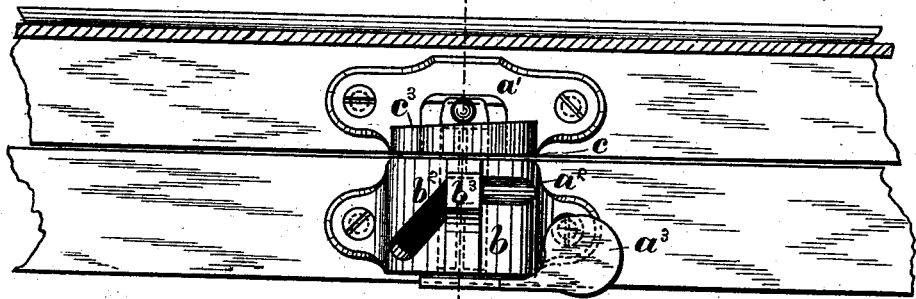
Figure 2:
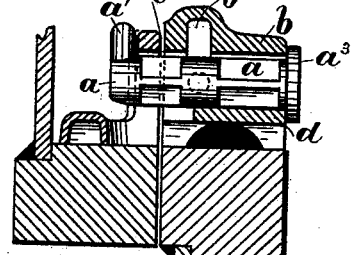
Figure 4:
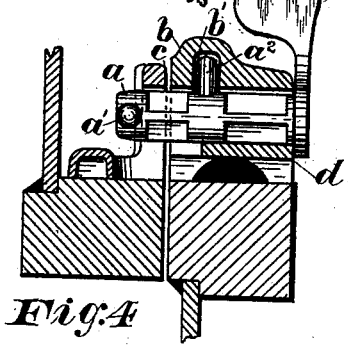
Figure 3:
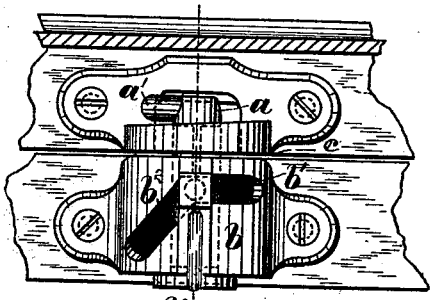
Figure 5:
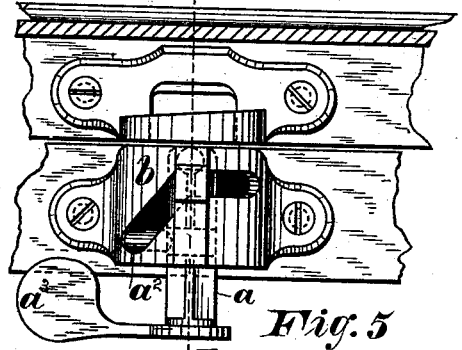
Figure 6:
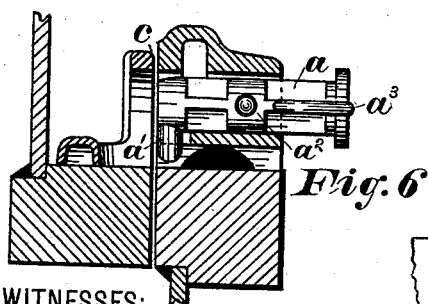
Figure 7:
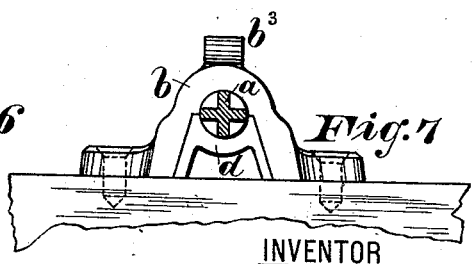
Figure 8:
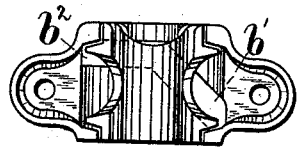
Figure 9:
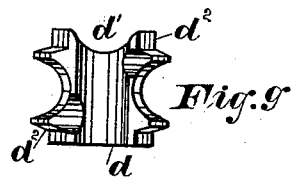
Figure 10:
Figure 11:
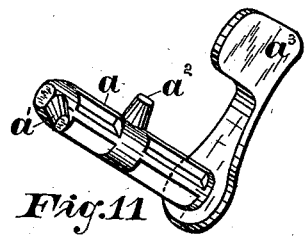
Figure 12:
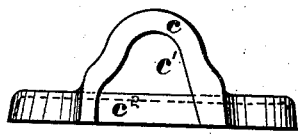
Figure 14:
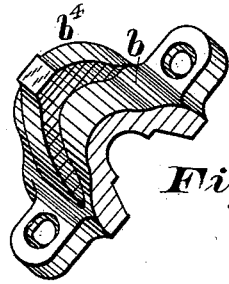
Figure 13:
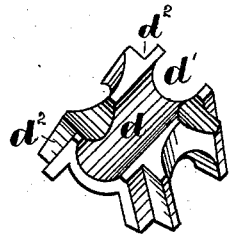

In the accompanying two sheets of drawings, in which similar reference-letters are employed to indicate corresponding parts, Figure 1 is a plan of a portion of the meeting-rails of a sash and the improved fastening in its locked position secured thereto. Fig. 2 is a section thereof through $x$. Fig. 3 is a plan of the fastening in its intermediate locking position. Fig. 4 is a section thereof through line $y$. Fig. 5 is a plan of the fastening in its unlocked position. Fig. 6 is a section of the same through line $z$, and Fig. 7 is an end view of the casing, &c. On Sheet 2, Fig. 8, is a plan of the outer slotted casing and the inner grooved block. Fig. 9 is a plan of said grooved block. Fig. 10 is an elevation of the end thereof. Fig. 11 is a perspective view of the rotating locking-bar. Fig. 12 is an elevation of the nose-piece with which the rotating locking-bar engages. Fig. 13 is a perspective view of the grooved block. Fig. 14 is a similar view of the slotted outer casing; and Fig. 15, an elevation of the fastening, showing the same adapted to be used on elevated windows.

Instead of rotating in a horizontal plane, as the ordinary sash-fastening, and thereby permitting the turning of the bolt by inserting a knife between the meeting-rails, the improved fastening device herein described rotates in a vertical plane, and in consequence is not open to the same objection.

To convert the rotary motion of the locking-bar $a$ into a longitudinal reciprocating motion in order to draw the bar, the said bar, having a hooked end, $a'$, is provided with a pin, $a^2$, which projects into a slot, $b'$, of peculiar form, in the outer casing, $b$, by means of which the said bar is allowed to move not only in the direction of its length, but also is caused to rotate for a given distance. To accomplish this the portion $b'$ of the said slot nearest the outside sash extends in a straight line parallel with the edge $c$ of the nose-piece from one side of the casing up to the top thereof, as shown in Figs. 1, 3, and 5, and on the opposite side of the casing the portion $b^2$ of said slot continues in a slanting or oblique direction away from the nose-piece, as indicated in said figures. The result of this construction is that as the bar $a$ is turned by means of the finger-piece $a^3$ it turns on its axis for about one-quarter of a revolution—i. e., while the pin is in the portion $b'$ of the slot—so that the hooked end turns from the position shown in Figs. 1 and 2 to that in Figs. 3 and 4.

By reference to Fig. 12 it will be seen that the opening $c'$ in the nose-piece is of peculiar form, the lower portion at one side thereof being broadened, and into the recess $c^2$, formed by said broadened portion, the hooked end of the bar projects when in the position shown in Figs. 3 and 4. When the locking-bar has reached this position, the pin $a^2$ enters the oblique portion $b^2$ of the slot, and as the bar continues to revolve the hooked end thereof is drawn through the recess $c^2$ away from the nose-piece until the said hooked end reaches the position indicated in Figs. 5 and 6, being drawn away from the nose-piece into the casing $b$, which is the unlocked position of the fastening device.

The effect or result produced by the recess $c^2$ may be accomplished by cutting away entirely one side of the nose-piece, leaving an opening through which the hooked end of the locking-bar may pass. The solid form, however, is considered preferable because of its greater strength.

To return the locking-bar to its locked position the said bar is turned to the point indicated in Figs. 1 and 2, in which position the hooked end engages with the loop of the nose-piece, and thereby effectually prevents the raising and lowering of the sashes. The hooked end $a'$ and the pin $a^2$ are preferably so formed in relation to the locking-bar $a$ that one projects from said bar at right angles to the other, as shown in Fig. 11, so that when the pin is in the end of the portion $b'$ of the angular slot in the casing the hooked end occupies a vertical position in relation to the meeting-rails, as indicated in Figs. 1 and 2. The outside edge, $c^3$, of the loop of said nose-piece is inclined, as indicated, so that as the hooked end of the bar is rotated to its locked position it engages with said inclined outer edge, and thereby acts to draw the meeting-rails of the sashes together, as will be understood.

Within the casing is a grooved supporting-block, $d$, in which the locking-bar turns, and also acts to hold said bar above the meeting-rails, so that the hooked end of the bar projects, when in its unlocked position, down toward the meeting-rails, as indicated in Fig. 6. To avoid the necessity of screwing or otherwise securing the said block to the body of the casing or to the windows, grooves or recesses $d^2$, Fig. 13, are cast in each corner of said block, which receive the sides of the casing, as shown in Fig. 8, so that no fitting is necessary to retain the block in position.

The slot in the casing may be left open, as indicated on Sheet 1, or a covering, $b^4$, may be provided for the same, as shown in Fig. 14, to prevent the clogging of the locking-bar.

Figure 15:
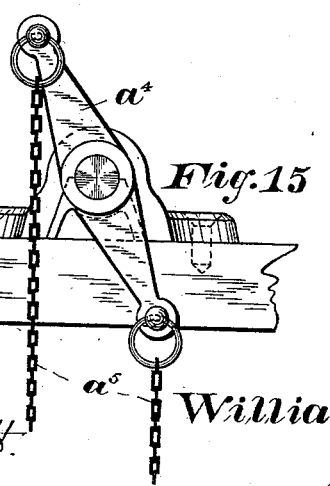

In Fig. 15 is shown a construction adapted especially for high windows, in which the meeting-rails are above the reach of the hand, the bar $a^4$ taking the place of the finger-piece, and operated by chains $a^5$, hanging down within reach of the hand. The rotary movement of the locking-bar permits this arrangement, as will be understood.

If desirable, the slot may be made continuous and the pin extended up therethrough and act as a finger-piece for operating the bar. As thus made, the finger-piece may be dispensed with.

When the pin $a^2$ is in the portion $b'$ of the angular slot and the locking-bar is turned, the result is a simple rotative movement, which continues as long as the pin is in said portion; but when the pin leaves said portion $b'$ and enters the portion $b^2$ the result is a combined rotary and sliding movement of the locking-bar, which becomes a reciprocating movement as the locking-bar is caused to engage with the nose-piece and is disengaged therefrom alternately.

Having thus described my invention, what I claim is—

1. In a sash and door fastener, the combination of a nose-piece provided with an opening to receive the hooked end of the locking-bar, a rotating and sliding locking-bar having a hook or projection on one end thereof, a pin, $a^2$, projecting therefrom, and a finger-piece, an inclosing-casing having a slot therein, into which said pin $a^2$ projects, said slot consisting of a straight portion, $b'$, adapted to permit the rotative movement of said bar when the said pin is therein and the bar turned, and a portion, $b^2$, inclined angularly in relation to said portion $b'$ and adapted to cause the combined rotative and sliding movement of the locking-bar when the pin $a^2$ is in said portion and the bar turned, and a supporting-block on which said bar moves, for the purposes set forth.

2. In a sash and door fastener, the combination of a nose-piece having an opening therein to receive the hooked end of a locking-bar, and an inclined outer edge, $c^3$, with which said hooked end engages, a locking-bar provided with a hooked end, a pin, $a^2$, projecting therefrom, and a finger-piece, an inclosing-casing having an angular slot consisting of the portions $b'$ and $b^2$, adapted to cause a simple rotary and a combined rotary and sliding movement of said bar, and a supporting-block upon which said bar turns, for the purposes set forth.

3. In a sash and door fastener, the combination of a nose-piece having an opening, $c'$, provided with a recess, $c^2$, therein and an inclined outer edge, $c^3$, a locking-bar provided with a hooked end, a pin, $a^2$, and a finger-piece, said hooked end and pin projecting from said bar at right angles to each other, an inclosing-casing having an angular slot therein consisting of the portions $b'$ and $b^2$, adapted to cause a simple rotary and a combined rotary and sliding movement of said bar, and a supporting-block, substantially as and for the purposes set forth.

4. In a sash and door fastener, the combination of a nose-piece having an opening therein to receive the hooked end of a locking-bar and provided with a recess therein through which said hooked end passes as the locking-bar is withdrawn, a rotating and sliding locking-bar having a hook or projection on one end thereof, a pin, $a^2$, projecting therefrom, and arms $a^4$, projecting oppositely from said bar, means attached to each end of said bar for operating the same and the locking-bar, an inclosing casing having an angular slot consisting of the portions $b'$ $b^2$, adapted to cause a simple rotary and a combined rotary and sliding movement of said bar, and a supporting-block upon which said bar turns, for the purposes set forth.

In testimony that I claim the invention set forth above I have hereunto set my hand this 21st day of October, 1886.

WILLIAM C. JOHNSON.

Witnesses:
FREDK. F. CAMPBELL,
JOSEPH HARRINGTON.